FP - FORE PERPENDICULAR
AF - AFT PERPENDICULAR

United States Patent Office 3,410,240
Patented Nov. 12, 1968

3,410,240
HULL FORMS
Thomas Baird Hutchison, Oxshott, Surrey, England, and John Lamond Millar, Stamford, Conn., assignors to Esso Research and Engineering Company, a corporation of Delaware
Filed Dec. 19, 1966, Ser. No. 602,858
Claims priority, application Great Britain, Dec. 23, 1965, 54,514/65
11 Claims. (Cl. 114—56)

ABSTRACT OF THE DISCLOSURE

The instant disclosure relates to new hull forms which enable one to increase the deadweight of a vessel and still obtain satisfactory speed-power relationships. The above mentioned advantages may be obtained by the use of a marine vessel with a hull having a blunt bow in which a lower portion of said bow is extended longitudinally forward of the forward perpendicular to form a smooth protuberance and wherein the vessel has a flume extending aft from the bow in a downward direction, and terminating in the bottom of the vessel. Also disclosed is a preferred configuration for a blunt stern in which the lower aft portion of the hull has one or more longitudinally oriented tunnels.

---

This invention relates to new hull forms which enables one to increase the deadweight of the vessel and still obtain satisfactory speed/power relationships.

In order to achieve an increase in carrying capacity or deadweight of cargo vessels one can increase the fullness of the underwater hull form. From this point of view the optimum underwater hull form would be similar in shape to a rectangular prism. However, such a shape means large inherent increases in total resistance due to increased wave resistance and to a lesser extent increased friction and form resistance.

According to this invention improved carrying capacity without the above mentioned disadvantages can be obtained by the use of a marine vessel having either (A) a blunt bow in which a lower portion of said bow is extended longitudinally forward of the forward perpendicular to form a smooth protuberance and wherein the vessel has a flume extending aft from the bow in a downward direction, and terminating in the bottom of the vessel; or (B) a blunt stern in which the lower aft portion of the hull has one or more longitudinally orientated tunnels. Preferably the marine vessel has both of features (A) and (B).

By the use of a marine vessel in accordance with this invention, one can often achieve at least a 10% and with both of features (A) and (B), at least a 20% increase in displacement compared with a comparable conventional vessel and still maintain the same speed/power relationship. Also according to this invention there could result in an improved speed/power relationship in the trimmed ballast condition due to the eased angle of entrance and relatively long water plane at the forward end (because of the presence of protuberances). In many cases also, pitching and rolling will be reduced. Furthermore, since compared with a conventional vessel, the length of parallel body is increased, the flow of water alongside the vessel will be improved due to the minimization of pressure variations.

Using feature (A) the marine vessel must have a blunt bow, by which we mean that the plane perpendicular to the sides and bottom of the vessel and passing through the forward hull portion of the vessel does not taper towards substantially rectangular shaped. In considering the shape of the above defined plane, slight concavity or convexity in the sides of the vessel or slight curvature at the bottom of the vessel for example, is ignored. In other words the forward hull portion of the vessel does not taper towards a single edge, as is the case in a conventionally shaped marine vessel.

The forward and after perpendiculars are defined as follows: The forward perpendicular is defined as the intersection of the loadwater line (LWL) and the forward extremity of the vessel at the LWL. The after perpendicular is defined as a line which is perpendicular to the intersection of the aft edge of the rudder post with the LWL. For vessels without a rudder post the after perpendicular is defined as the centre line of the rudder stock.

In many cases the employment of a vessel with a blunt bow will mean that the total area (i.e. including the area of the flumes and protuberances) of the plane bounded by, and perpendicular to the LWL, sides and bottom of the vessel and passing through the forward perpendicular will be at least 90% of the area of cross-section of the vessel amidship. In a preferred embodiment of the invention the hull is substantially rectangular shaped except for the presence of protuberances, forward or aft extending solids, and flumes. Thus, it is preferred that the vessel has a high block coefficient ($C_b$), this coefficient being a measure of the extent to which the shape of the ship approximates to a long rectangular prism. The block coefficient is normally given by the formula:

$$C_b = \frac{35\Delta}{L_s \times B \times D}$$

where:
$\Delta$ = displacement in tons in salt water
$L_s$ = length in feet between the forward and after perpendiculars
$B$ = beam amidships, in feet
$D$ = draft to LWL, in feet In practice with the vessels of this invention the value of the block coefficient will approach or even equal unity or over, e.g. be between 0.8 and 1.0.

The lower portion of the bow extended to form a smooth protuberance will lie below the LWL and will partially lie below the ballast waterline (BWL). The protuberance can take various shapes, but is preferably shaped to operate efficiently hydrodynamically in conjunction with a flume, i.e. so as to co-operate closely with the flume. In a preferred embodiment of the invention the protuberance has two portions situated either side of the flume and below the forward end of the flume which portions project forward of the forward perpendicular. The transverse cross-section of these sections is preferably substantially circular or elliptical. These side portions can be extended transversely towards the centre line plane and form a central portion of the protuberance, the cross-section of which central portion along the centre line plane is preferably substantially pear-shaped with the thin end tapering towards the forward perpendicular, in an aftwards direction. The large end of the pear-shaped central portion does not extend upwards as much as the side portions of the protuberance so that water flowing towards and over the protuberance is directed towards the mouth of the flume. The pear-shaped portion which lies below the BWL is also designed to give maximum lift to the forward end of the vessel, and also increase the rigidity of the protuberance.

In other alternative embodiments the central portion of the protuberance may be omitted, and the bow can have two side portions in the form of wing bulbs. Furthermore, if desired the side portions can be shaped so that the axes of their transverse cross-sections are inclined to the vertical.

The mouth of the flume lies substantially in the transverse plane of the forward perpendicular, and is located above the protuberance, and the flume extends in a downward direction until it terminates in the bottom of the vessel. The average cross-sectional area of the flume can vary but should allow unrestricted flow of water to the bottom of the vessel. Preferably it should be as small as possible so as to achieve maximum displacement consistent with unrestricted flow of water. The angle of slope of the flume will generally be between 30° and 60°, e.g. about 45° to the forward perpendicular of the vessel. If desired one could employ a pump or pumps to improve the flow of water through the flume.

Although the vessel may have only one flume, if desired more than one flume may be used. If there are two or more flumes the protuberance should preferably be shaped so as to operate efficiently in conjunction with all the flumes. Thus, if there are two flumes the preferred shape of protuberance as described above can be modified. The modified shape can be considered as two of the above described protuberances joined together transversely having previously removed half of the side portion in each of the two protuberances. The modified protuberance will thus have three prominent portions one at the port side, one at the starboard side, and one on the centre line plane of the vessel, and two less prominent portions with pear shaped longitudinal cross-sections, each portion being situated below one of the two flumes.

When feature (B) is employed one uses a blunt stern by which we mean that the plane perpendicular to the sides and bottom of the vesel and passing through the after perpendicular is substantially rectangular shaped. In considering the shape of this defined plane one ignores the inlets to the tunnels and slight concavity or convexity of the sides, or curvature at the bottom of the vessel, for example. By using feature (B) one achieves improved propulsion due to more uniform wake in the way of the propeller. With the described arrangement of tunnels aft, it should be possible to operate the vessel at reduced draught aft than normal for the trimmed ballast condition. The combined suction effect of the tunnels and propeller or propellers will ensure that the propeller region is adequately supplied with water to allow efficient propulsion. In effect, the BWL could be lower than the actual water line inside the tunnels without affecting the propulsive efficiency.

Although one may use only one tunnel it is preferable if there are two tunnels. The propeller or twin propellers can be accommodated in the tunnel or tunnels. It is preferable for the outer boundaries of the tunnel to be extended in the aft direction aft of the after penpendicular. This may be accomplished by extending the hull aft of the after perpendicular to form smooth streamlined bodies. In this manner, greater protection from external damage is given to both propeller and rudder. These streamlined bodies need not be very long, for example between about 1% and 4% of the length of the vessel. The tunnels themselves should preferably be longer, e.g. between about 4% and 10% of the length of the vessel.

The invention is now described with reference to the accompanying drawings in which.

Figures 1, 1A:
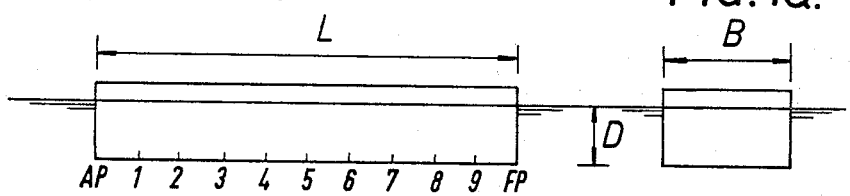
FIGURE 1 and 1a show a longitudinal and side elevation respectively of a prism-shaped vessel.
Figure 2:
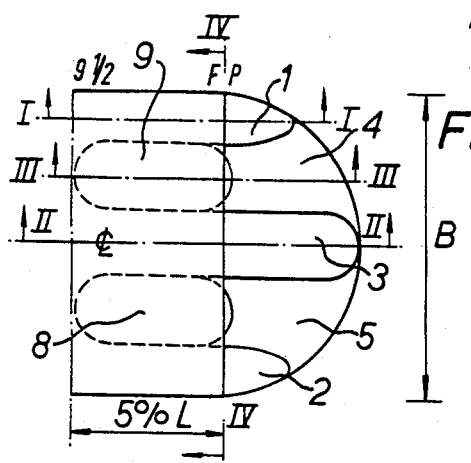
FIGURE 2 shows a plan view of one form of a bow of a vessel of the invention.
Figure 2A:
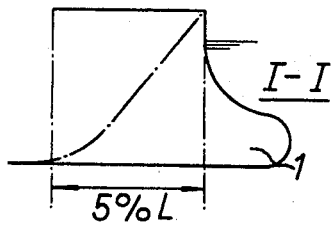
FIGURES 2a, 2b, 2c and 2d show cross-sectional elevations along the lines I—I, II—II, III—III, and IV—IV respectively of FIGURE 2.
Figure 2B:
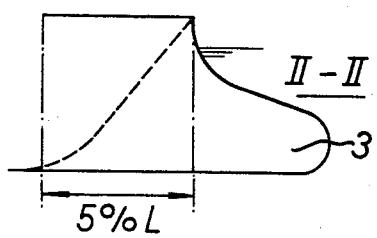
Figure 2C:
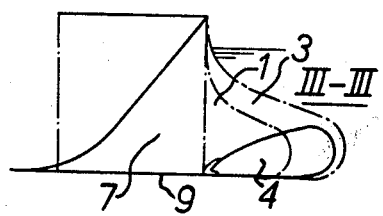
Figure 2D:
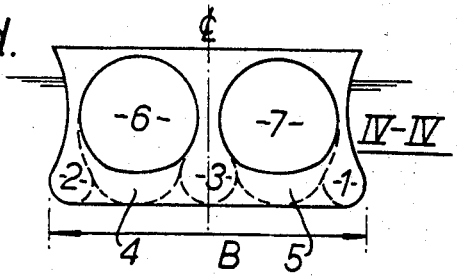
Figure 4A:
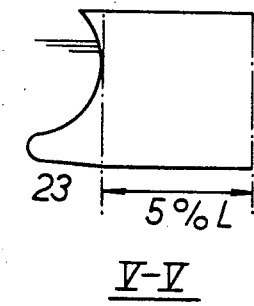
FIGURES 4a, 4b and 4c show cross-sectional elevations along the lines V—V, VI—VI and VII—VII respectively of FIGURE 4.
Figure 4B:
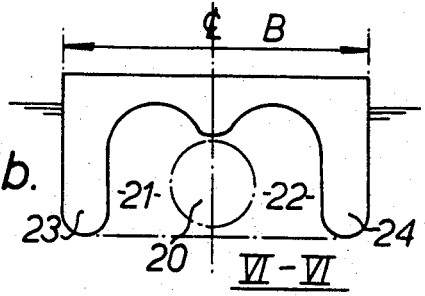
Figure 4C:
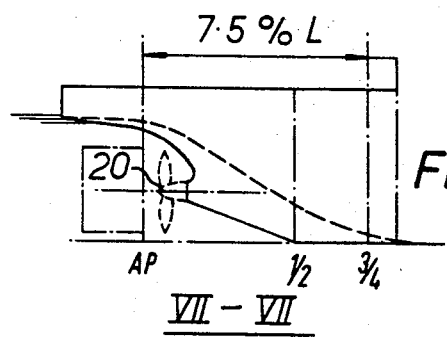

Referring to the drawings, FIGURES 1 and 1a show the fore and aft perpendiculars as well as the principal dimensions of the length L, breadth B and draft D. From FIGURES 2, 2a, 2b and 2c it is seen that the protuberance has prominent portions 1, 2 and 3 which extend forward of the forward perpendicular, and that the middle portion 3 extends further from the forward perpendicular than portions 1 and 2. Less prominent portions of the protuberance having pear-shaped or aerofoil cross-sections in their longitudinal axes are shown at 4 and 5. The two flumes are shown at 6 and 7 and they have outlets in the bottom of the vessel at 8 and 9 respectively. It is seen that the effect of the portions 4 and 5 is to give the flumes an extended mouth in the forward direction.

Figure 3:
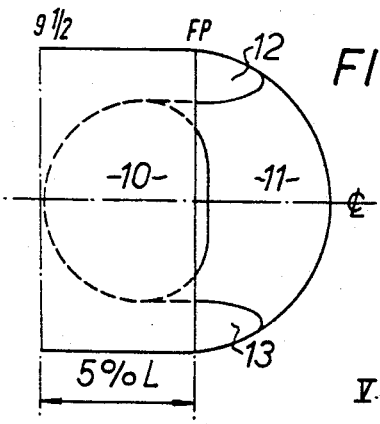
FIGURE 3 shows a plan view of an alternative bow to that shown in FIGURE 2.
Figure 4:
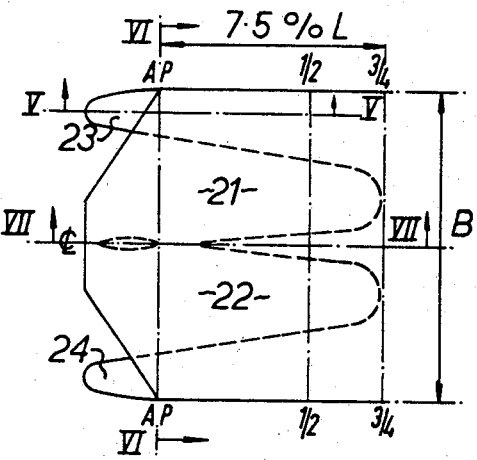
FIGURE 4 shows a plan view of the stern of a vessel of the invention.
Figure 3A:
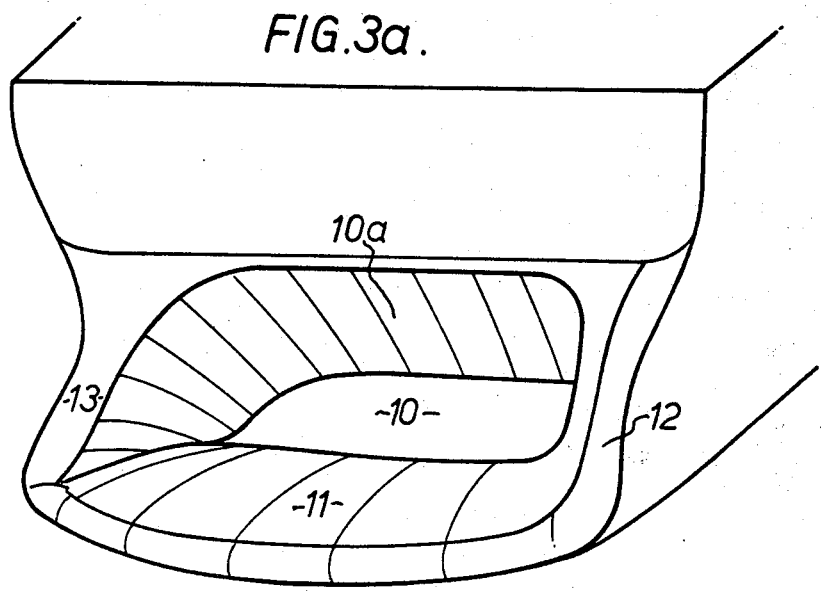
FIGURE 3a shows a perspective view of the bow shown in FIG. 3.

In the bow shown in FIGURES 3 and 3a the bow has only one flume 10a with its outlet 10 in the bottom of the vessel. Associated with the flume is the protruberence with a hydrodynamically designed central portion 11 and side portions 12 and 13.

With the bow structures described with reference to FIGURES 2, 2a, 2b, 2c, 2d and 3 the wave resistance will be reduced compared with a vessel having an extremely blunt entrance. This is because the more prominent portions 1, 2, 3, 12 and 13 of the protuberances are deeply submerged and increase the speed of flow of water into the flume 10 or flumes 6 and 7 in association with the less prominent portions 4, 5 and 11 of the protuberances which tend to create upward lift and therefore promote rapid conductance of aft flow of water into the flume entrances. In addition the flow of water immediately forward of the forward perpendicular is increased thereby creating a bow wave of opposite sign, and this therefore annuls the inherent bow wave. Provided the inlet and outlets of the flumes are correctly designed any excess mass of water being pushed ahead of the vessel can be absorbed and conducted towards the bottom of the vessel.

Referring to FIGURES 4, 4a, 4b and 4c of the drawings, the aft end is designed for a single propeller 20. It is seen that there are two longitudinally orientated tunnels 21 and 22, and there are two streamlined extending bodies 23 and 24.

By introducing these bodies 23 and 24 which form the outward boundaries of the tunnels 21 and 22, the shape of the vessel is maintained as a parallel body giving maximum displacement as well as the uniform wake desired at the propeller disc. Also, since these bodies 23 and 24 are extended aft of the aft perpendicular, a relative increase in flow is maintained on this area, and furthermore, greater protection from external damage is given to both propeller and rudder. Instead of having a single propeller 20, one could have twin propellers, one in each of the tunnels 21 and 22.

Figure 5:
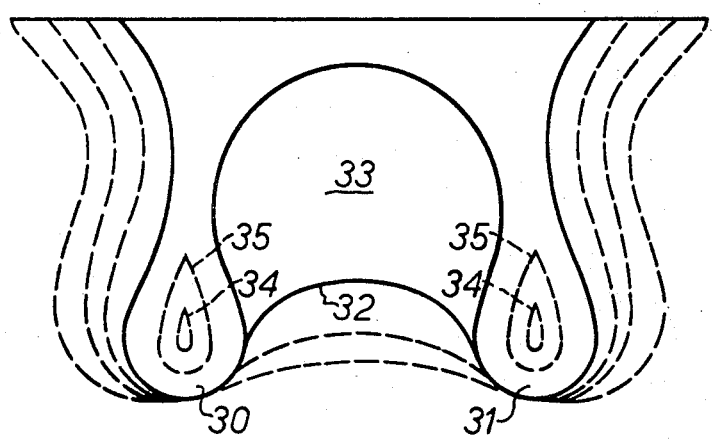
FIGURE 5 shows a cross-sectional elevation of another embodiment of a bow of a vessel of the invention.

Referring to FIGURE 5 of the drawings, the wing bulbs 30 and 31 are nearer the centre line of the vessel than in the previously described embodiments. There is also no central section, the line 32 indicating part of the throat of the flume 33. The broken lines 34 and 35 indicate the shape of the bulbs forwards, whilst the remaining broken lines indicate the shape of the flume, and wing bulbs 30 and 31, aftwards.

Figure 6:
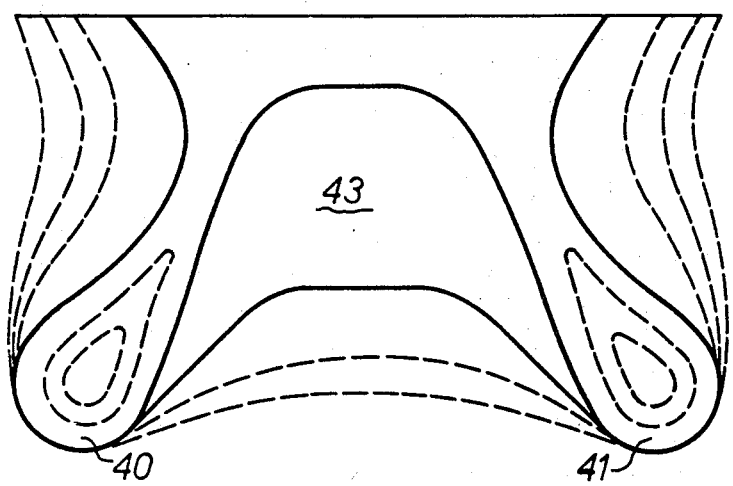
FIGURE 6 shows a cross-sectional elevation of another embodiment of a bow of a vessel of the invention.

Referring to FIGURE 6 of the drawings, in this case the wing bulbs 40 and 41 are tilted, but otherwise the construction is similar to that shown in FIGURE 5, except that the throat of the flume 43 is of rather different shape.

What is claimed is:
1. In a hull for a marine vessel the improvement which comprises a blunt bow in which a lower portion of said bow is extended longitudinally forward of the forward perpendicular to form a smooth protuberance, said bow also having a flume extending aft from the bow in a downward direction and terminating in the bottom of the vessel.
2. A hull as claimed in claim 1 wherein said hull is provided with a blunt stern with one or more longitudinally oriented tunnels in the lower aft portion of said stern and the hull is substantially rectangular shaped except for the presence of protuberances, forward or aft extending solids and flumes.
3. A hull as claimed in claim 1 in which the protuberance comprises two portions situated either side of the flume and below the forward end of the flume, which portions project forward of the forward perpendicular.
4. A hull as claimed in claim 3 wherein the transverse cross-section of said portions is substantially circular or elliptical.
5. A hull as claimed in claim 3 wherein the side portions are extended transversely towards the centre line plane to form a central portion of the protuberance.
6. A hull as claimed in claim 5 wherein the cross-section of said central portion along the centre line plane is substantially pear-shaped with the thin end tapering towards the forward perpendicular in an aftwards direction.
7. A hull as claimed in claim 6 wherein the protuberance has side portions which are shaped so that the axes of their transverse cross-sections are inclined to the vertical.
8. A hull as claimed in claim 1 wherein the angle of slope of the flume is between 30° and 60° to the forward perpendicular of the vessel.
9. A hull as claimed in claim 1 wherein the lower aft portion of the hull has two tunnels.
10. A hull as claimed in claim 1 wherein the hull is extended aft of the after perpendicular to form smooth streamlined bodies.
11. A hull as claimed in claim 1 wherein the block coefficient is between 0.8 and 1.0.

References Cited

UNITED STATES PATENTS

| 1,771,402 | 7/1930 | De Spuches | 115—39 |
| 2,483,663 | 10/1949 | Nowak | 114—62 XR |

FOREIGN PATENTS

| 759,590 | 12/1942 | Germany. |
| 956,241 | 7/1949 | France. |

ANDREW H. FARRELL, *Primary Examiner.*